United States Patent
Tanaka

(10) Patent No.: US 8,249,433 B2
(45) Date of Patent: Aug. 21, 2012

(54) DATA MULTIPLEXING APPARATUS

(75) Inventor: Kenji Tanaka, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 1632 days.

(21) Appl. No.: 11/341,529

(22) Filed: Jan. 30, 2006

(65) Prior Publication Data

US 2006/0171446 A1    Aug. 3, 2006

(30) Foreign Application Priority Data

Jan. 31, 2005   (JP) ................................. 2005-022838

(51) Int. Cl.
*H04N 5/84* (2006.01)
*H04N 5/89* (2006.01)
*H04N 5/93* (2006.01)
*G09F 27/00* (2006.01)

(52) U.S. Cl. .................. 386/344; 386/354; 381/124

(58) Field of Classification Search .................. 386/95, 386/90, 125, 126, 46; 375/143, 135, 136
See application file for complete search history.

(56) References Cited

U.S. PATENT DOCUMENTS

| | | | |
|---|---|---|---|
| 5,802,068 A * | 9/1998 | Kudo ............................. 370/538 |
| 6,021,440 A * | 2/2000 | Post et al. ...................... 709/231 |
| 6,198,728 B1 * | 3/2001 | Hulyalkar et al. ......... 370/310.1 |
| 6,993,081 B1 * | 1/2006 | Brunheroto et al. ..... 375/240.28 |
| 7,395,208 B2 * | 7/2008 | Chrysanthakopoulos et al. ............................. 704/278 |
| 7,567,576 B2 * | 7/2009 | Murphy ........................ 370/401 |
| 2001/0023454 A1 * | 9/2001 | Fitzgerald ..................... 709/233 |
| 2002/0016970 A1 * | 2/2002 | Negishi et al. .................. 725/88 |
| 2002/0181459 A1 * | 12/2002 | Ohta et al. ..................... 370/389 |
| 2004/0064320 A1 * | 4/2004 | Chrysanthakopoulos et al. ............................. 704/275 |

* cited by examiner

*Primary Examiner* — William C Vaughn, Jr.
*Assistant Examiner* — Gelek W Topgyal
(74) *Attorney, Agent, or Firm* — McGinn IP Law Group, PLLC

(57) ABSTRACT

A data multiplexing apparatus for arranging video streams and audio streams respectively into packs and multiplexing these packs to create a system stream. The apparatus includes a virtual decoding video buffer occupancy calculator virtually calculating an occupancy of a decoding video buffer temporarily storing the video streams, a virtual decoding audio buffer occupancy calculator virtually calculating an occupancy of a decoding audio buffer temporarily storing the audio streams, a virtual decoding audio buffer storing a calculation result in the virtual decoding audio buffer occupancy calculator, and a payload length setting section setting an overflow limit value for the virtual decoding audio buffer. The payload length setting section sets the overflow limit value to a value of an integral multiple of an audio frame length.

17 Claims, 10 Drawing Sheets

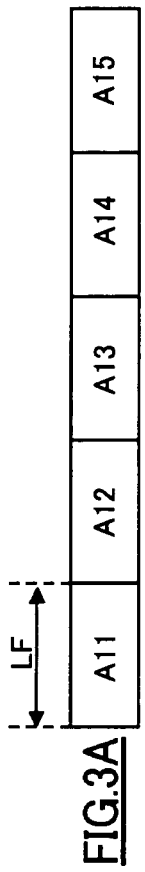
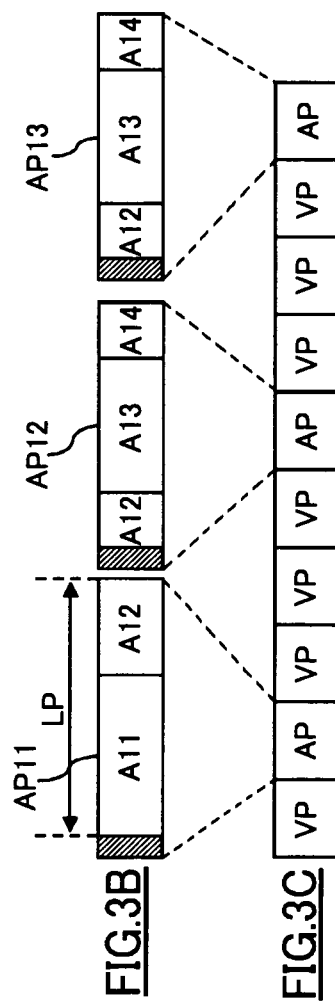
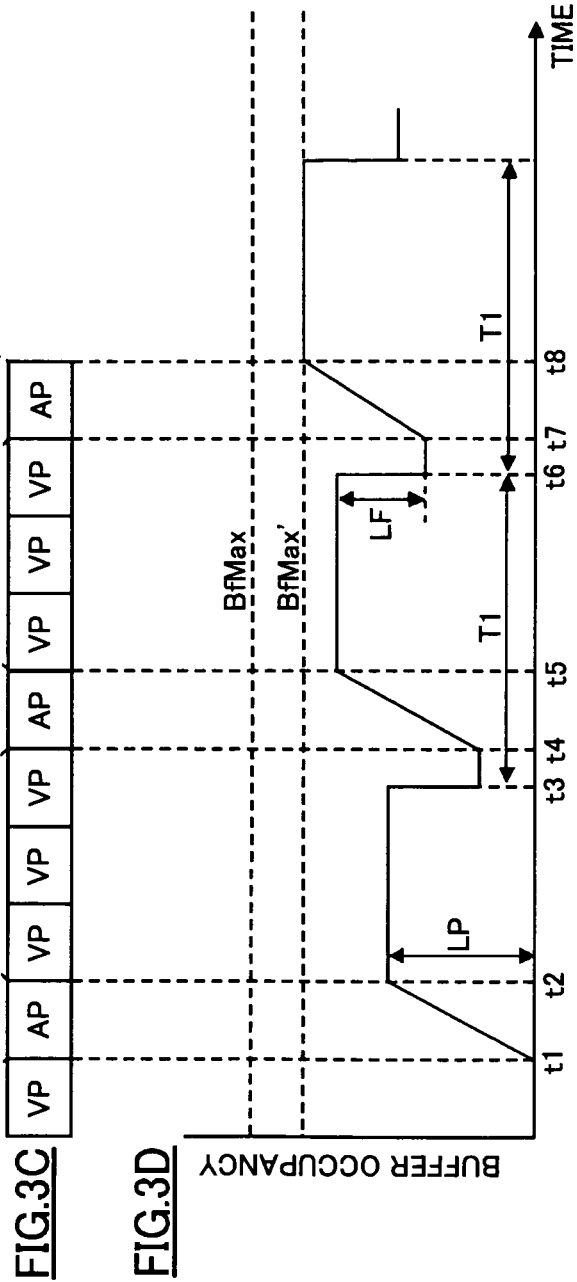
FIG.3A  FIG.3B  FIG.3C  FIG.3D

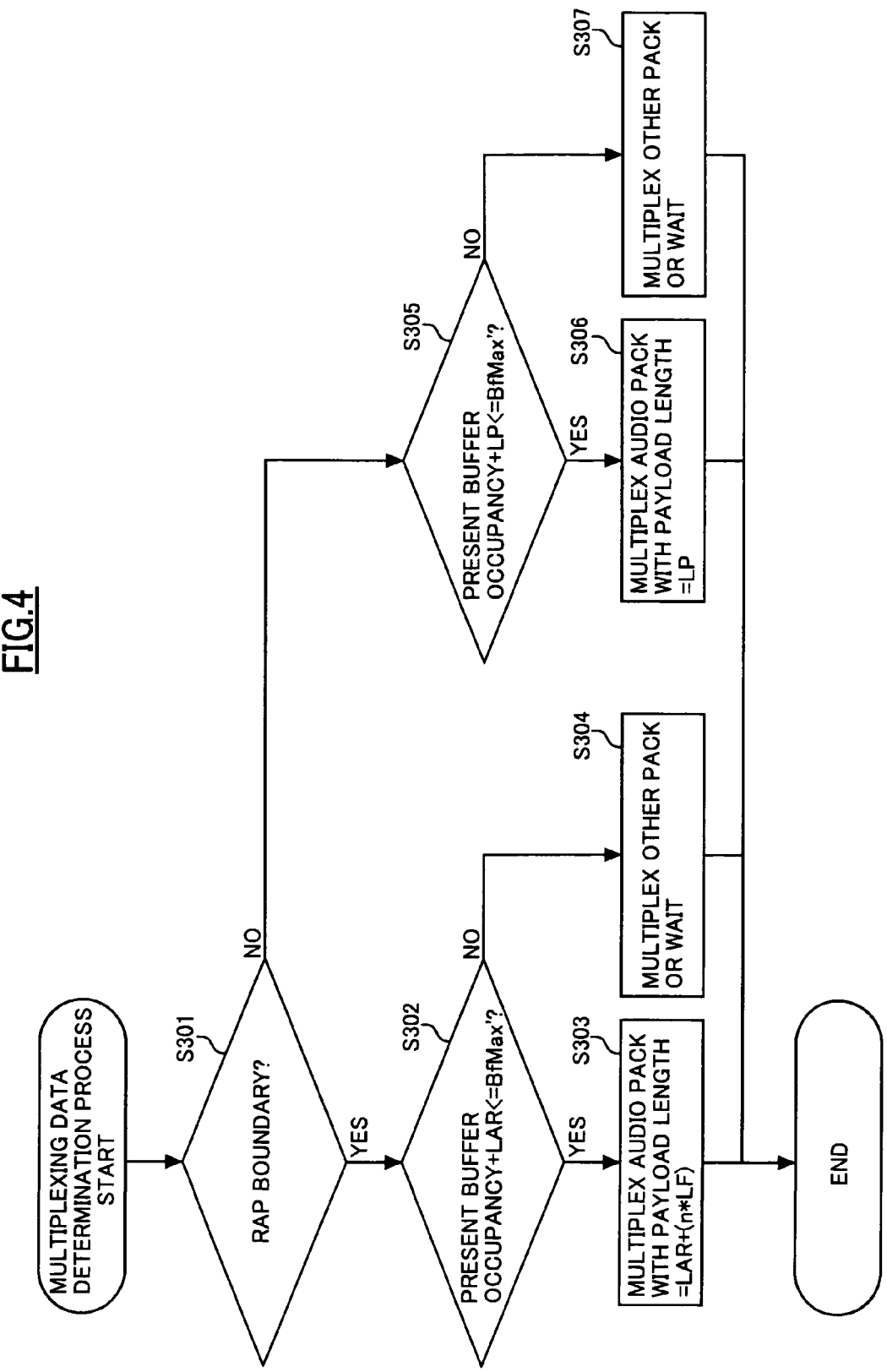

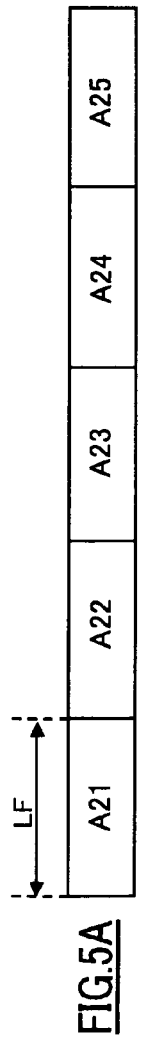
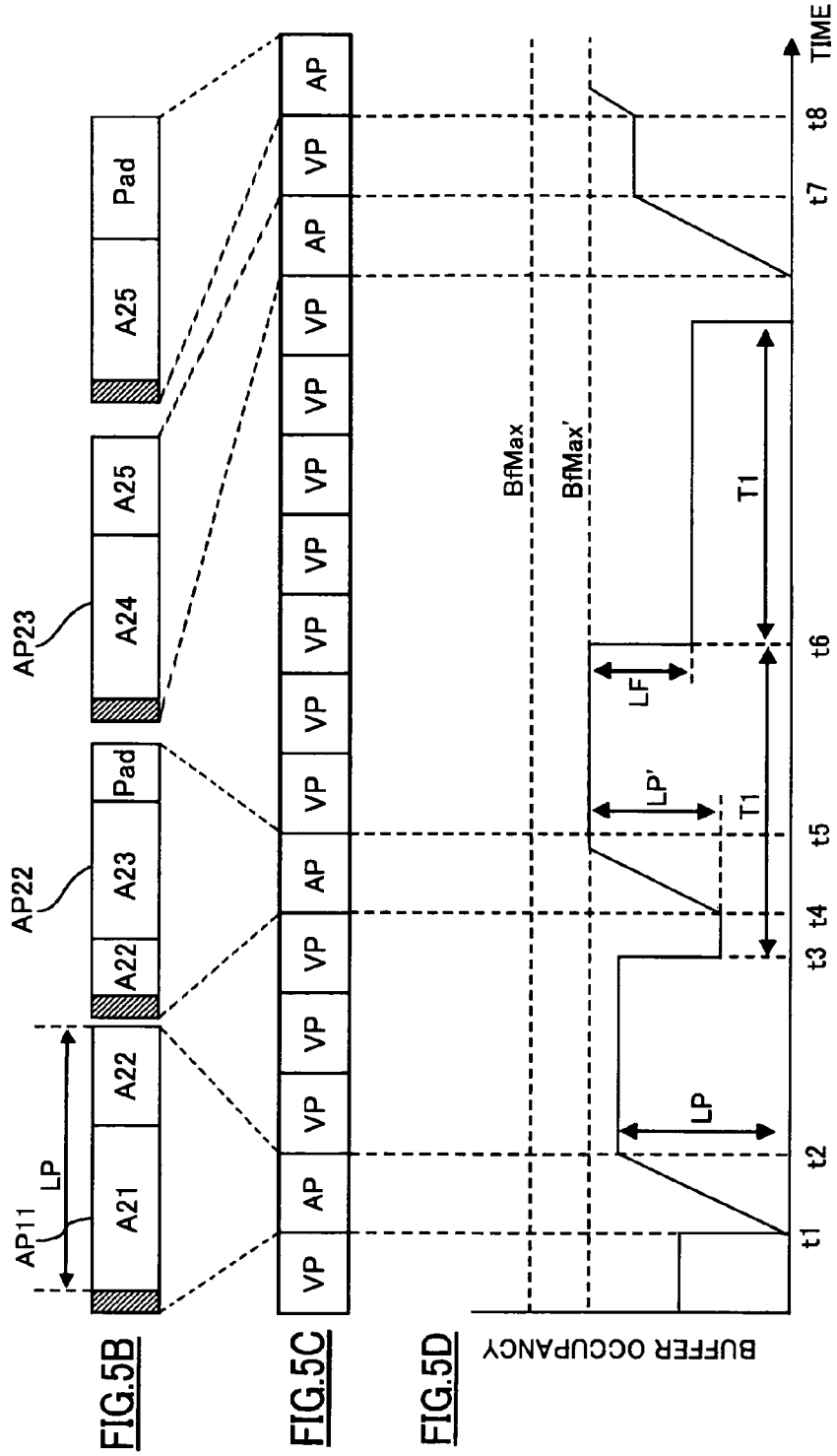
FIG.5A
FIG.5B
FIG.5C
FIG.5D

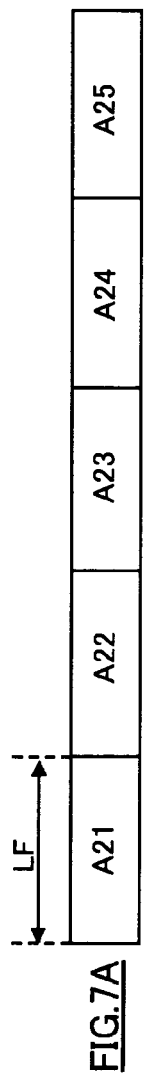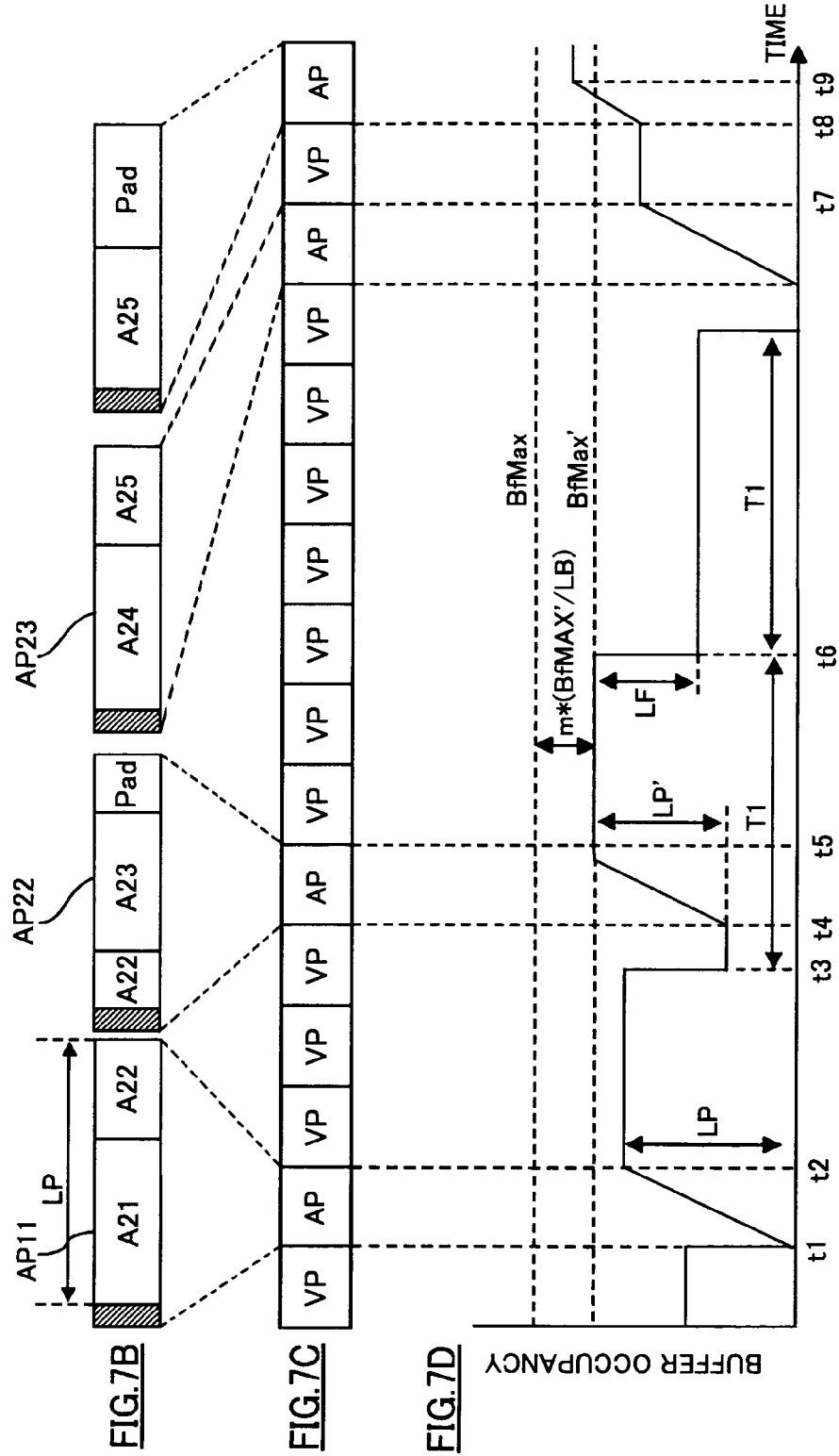
FIG.7A
FIG.7B
FIG.7C
FIG.7D

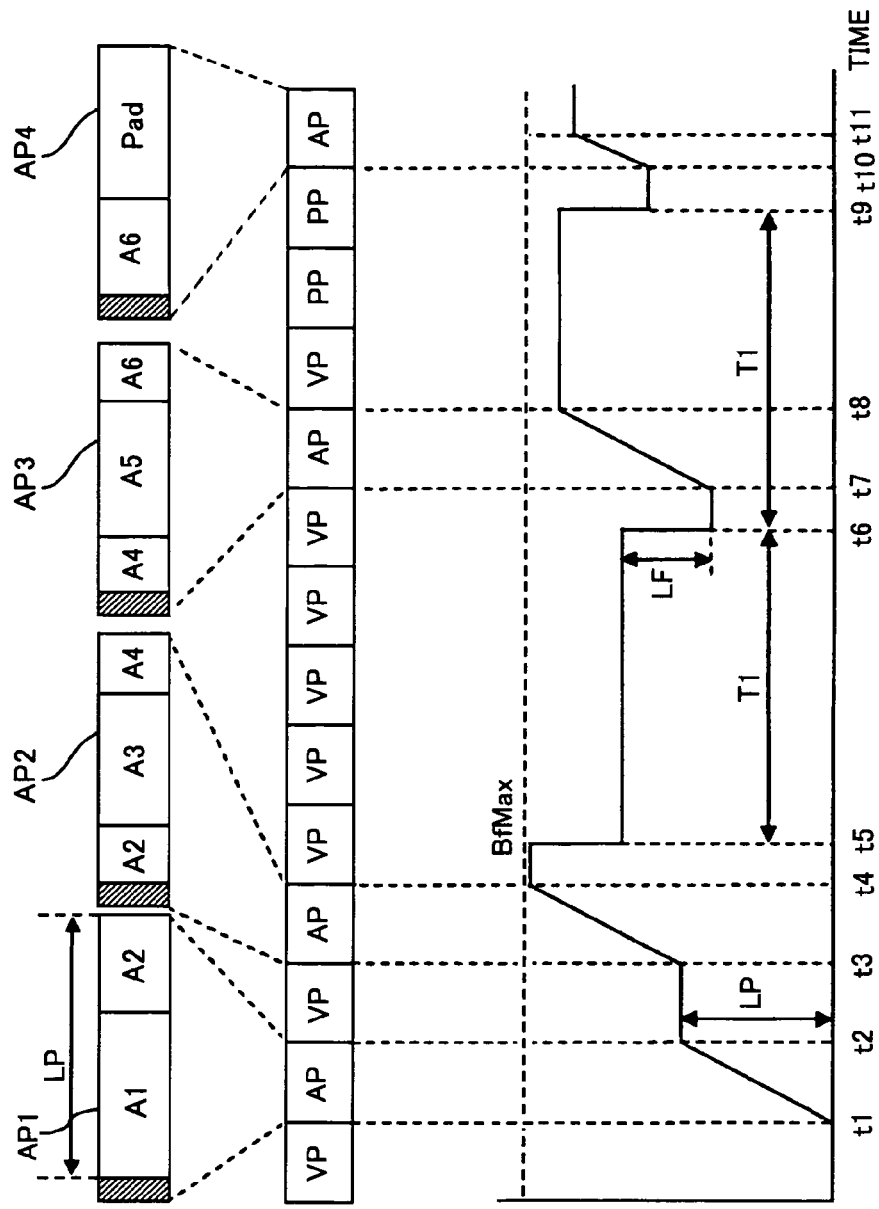

DATA MULTIPLEXING APPARATUS

BACKGROUND OF THE INVENTION

1. Field of the Invention

The present invention relates to a data multiplexing apparatus and a data multiplexing method for multiplexing a plurality of data streams.

2. Description of Related Art

Moving Picture Expert Group (MPEG) standard and DVD-Video standard are known as the international standards for encoding of video data and audio data and multiplexing of these data. Since the video data and audio data are basically data strings that access sequentially, they are encoded as a video stream and an audio stream, respectively. The video data and audio data are encoded and multiplexed based on the above standards.

FIG. 8 is a block diagram that shows the schematic configuration of a data multiplexing apparatus based on the above standards. FIG. 8 also shows a part of the configuration of a data separating apparatus. A conventional data multiplexing apparatus includes a video encoder 101, an encoding video buffer 102, an audio encoder 103, an encoding audio buffer 104, a multiplexer 105, and a multiplexing controller 106.

The video encoder 101 encodes an input digital video signal and generates a video stream that is a data sequence of video data. The encoding video buffer 102 temporarily stores the video stream.

The audio encoder 103 encodes an input audio PCM signal and generates an audio stream that is a data sequence of audio data. The encoding audio buffer 104 temporarily stores the audio stream.

The multiplexer 105 multiplexes the video stream output from the encoding video buffer 102 and the audio stream output from the encoding audio buffer 104 to create a system stream. The multiplexing controller 106 controls the amount of video and audio streams and determines a timing of multiplexing or the like.

According to the above standards, a video stream and an audio stream are multiplexed in units of packs. The system stream is thus made up of a plurality of video packs and a plurality of audio packs.

To decode the system stream created in the above multiplexing apparatus, the separating apparatus 107 separates the system stream into an audio stream and a video stream and temporarily stores them into a decoding video buffer 108 and a decoding audio buffer 109, for example, thereby decoding them.

Therefore, the multiplexing apparatus that encodes data needs to control the timing of multiplexing so that the decoding video buffer 108 and the decoding audio buffer 109 in the separating apparatus do not overflow or underflow. To implement this control, the multiplexing controller 106 has a virtual decoding video buffer and a virtual decoding audio buffer and calculates their occupancies.

FIG. 9 is a block diagram that shows the detailed configuration of the multiplexing controller 106. The multiplexing controller 106 includes an encoding video stream amount storage 201, a virtual decoding video buffer occupancy calculator 202, a virtual decoding video buffer 203, an encoding audio stream amount storage 204, a virtual decoding audio buffer occupancy calculator 205, a virtual decoding audio buffer 206, a control signal generator 207, and a multiplexing data determinater 208.

The encoding video stream amount storage 201 stores the amount of video streams that are stored in the encoding video buffer 102. The virtual decoding video buffer occupancy calculator 202 virtually calculates the amount of video streams that are accumulated in the decoding video buffer 108 and stores the result into the virtual decoding video buffer 203. The virtual decoding video buffer 203 is a register or the like for storing the calculation results and it stores a virtual value of the occupancy amount of the decoding video buffer 108 in the decoder.

The encoding audio stream amount storage 204 stores the amount of audio streams that are stored in the encoding audio buffer 104. The virtual decoding audio buffer occupancy calculator 205 virtually calculates the amount of audio streams that are accumulated in the decoding audio buffer 109 and stores the result into the virtual decoding audio buffer 206. The virtual decoding audio buffer 206 is a register or the like for storing the calculation results and it stores a virtual value of the occupancy amount of the decoding audio buffer 109 in the decoder.

The multiplexing data determinater 208 determines the type of pack to be multiplexed, the length of a stream and the timing of multiplexing based on the amount of video streams stored in the encoding video buffer 102, the amount of audio streams stored in the encoding audio buffer 104, the virtual occupancy amount of the decoding video buffer stored in the virtual decoding video buffer 203, and the virtual occupancy amount of the decoding audio buffer stored in the virtual decoding audio buffer 206. The control signal generator 207 generates a signal for informing the multiplexer 105 of what is determined by the multiplexing data determinater 208.

The operation that the multiplexing apparatus multiplexes data is described hereinafter with reference to FIG. 10. The following description is given mainly on an audio stream. The standards such as MPEG regulate data are in hierarchy. The audio stream is composed of a plurality of successive audio frames. The audio frame is a minimum unit of audio data whose length (frame length; LF) is fixed. When multiplexing the audio stream into a system stream, it is necessary to arrange an audio stream in a plurality of audio frames into an audio pack.

FIGS. 10A and 10B show this operation schematically. FIG. 10A shows an entire audio stream, which is made up of six audio frames A1 to A6. A random access point (RAP), which is described later, is set after the audio frame A6. FIG. 10B shows a fixed length audio pack AP. The audio pack includes a header, and a length after subtracting a header length from a pack length is a maximum stream length LP that can be included in the audio pack.

The case of arranging the six audio frames A1 to A6 shown in FIG. 10A into four audio packs AP1 to AP4 shown in FIG. 10B is described herein. A maximum stream length LP of an audio pack is different from a frame length LF of an audio frame. Therefore, if the audio frames A1 and A2 shown in FIG. 10A are arranged into one audio pack, the stream up to the middle of the audio frame A2 is normally included in the audio pack AP1. Thus, the audio pack AP1 shown in FIG. 10B includes the audio frame A1 and a part of the audio frame A2. The following audio pack AP2 includes the rest part of the audio frame A2, the audio frame A3, and a part of the audio frame A4. The audio pack AP3 includes the rest part of the audio frame A4, the audio frame A5, and a part of the audio frame A6. The audio pack AP4 includes the rest stream of the audio frame A6 and invalid data (padding packet). The padding packet is detailed later.

The audio packs AP that multiplexes a plurality of audio frames are then multiplexed with video packs VP in the multiplexer 105, thereby creating a system stream. FIG. 10C shows the system stream.

FIG. 10D is a view showing a buffer occupancy in a virtual decoding audio buffer when arranging the plurality of audio frames into audio packs. This is calculated by the virtual decoding audio buffer occupancy calculator 205. In FIG. 10D, BfMax indicated by a dotted line corresponds to an upper limit of the virtual decoding audio buffer. The upper limit is determined by the above standards or the like.

A normal operation is as follows. At time t1, since the free space of the virtual decoding audio buffer is not smaller than the maximum stream length LP, it is determined to multiplex an audio pack corresponding to a maximum stream length LP. Thus, the stream that includes the audio frame A1 and a part of the audio frame A2 is arranged into the audio pack AP1. The occupancy of the virtual decoding audio buffer thereby increases by the amount corresponding to the maximum stream length LP as shown from the time t1 to t2 in FIG. 10D. The gradient of the occupancy of the virtual decoding audio buffer at this time is based on a bit rate. Then, a video pack is multiplexed therewith from t2 to t3 of FIG. 10D. Since the audio pack is not multiplexed at this time, no change occurs in the occupancy of the virtual decoding audio buffer.

Then, at t3 in FIG. 10D, since the free space of the virtual decoding audio buffer is still not smaller than the maximum stream length LP, it is determined again to multiplex an audio pack corresponding to a maximum stream length LP. Thus, from t3 to t4, the occupancy of the virtual decoding audio buffer increases at the gradient based on the bit rate. At the time from t4 to t5, since the free space of the virtual decoding audio buffer is smaller than the maximum stream length LP, no audio pack is multiplexed with the system stream. Therefore, the multiplexer multiplexes a video pack or enters a wait time when no multiplexing is performed.

On the other hand, the occupancy of the virtual decoding audio buffer decreases by the amount corresponding to the audio frame length LF that is virtually assumed to be decoded already at every predetermined time as in t5 and t6 in FIG. 10D. The decrease is not at the gradient based on the bit rate like the increase in the occupancy but occurs at once in the above standards. Therefore, after a certain period of time, the free space of the virtual decoding audio buffer becomes the maximum stream length LP or larger. At that time, the audio packs are again multiplexed into the system stream like at t7 in FIG. 10D. Then, the occupancy of the virtual decoding audio buffer increases based on the gradient of the bit rate as shown from t7 to t8 in FIG. 10D.

The creation of an audio pack immediately before the time point called a random access point (hereinafter referred to as RAP) is described below. Since the standards such as MPEG do not allow reproduction of successive streams from an arbitrary point, a point (RAP) from which reproduction can be started is set at each predetermined time. It is necessary for the stream immediately after RAP to begin with a video stream with an image that is not associated with another image, if it is a video stream. If it is an audio stream, the stream immediately after RAP preferably begins with the head of an audio frame, which is a minimum unit.

Therefore, immediately before RAP, the audio pack is multiplexed even if the free space of the virtual decoding audio buffer is smaller than the maximum stream length LP. A change in occupancy in this case occurs from t10 to t11 in FIG. 10D.

Immediately before the RAP boundary, the audio packs are multiplexed if the free space of the virtual decoding audio buffer is equal to or larger than the rest of the stream of the audio frame. The audio pack corresponds to the audio pack AP4 in FIG. 10B and the rest of the audio stream of the audio frame A6 is arranged into the audio pack.

In this case, however, since the audio pack has a fixed length, invalid data, which is the padding packet described earlier, is added to the rest of the stream of the audio frame A6 so as to reach the fixed audio pack length, thus forming an audio pack. The occupancy of the virtual decoding audio buffer increases by the amount of the rest of the stream of the audio frame A6, which is valid data, in the audio pack AP4.

If, on the other hand, the free space of the virtual decoding audio buffer is smaller than the rest of the audio frame, it is impossible to perform the multiplexing of the audio pack. Therefore, by the time when the multiplexing of the audio pack becomes available, an invalid pack that is entirely composed of invalid data is inserted as shown from t8 to t9 in FIG. 10D.

As described above, the present invention has recognized that conventional multiplexing apparatus implement insertion of invalid packs and writing of invalid data according to the state of a virtual decoding audio buffer, which results in a decrease in bit rate of the entire apparatus.

SUMMARY OF THE INVENTION

According to an aspect of the present invention, there is provided a data multiplexing apparatus for arranging video streams and audio streams respectively into packs and multiplexing these packs to create a system stream. The apparatus includes a virtual decoding video buffer occupancy calculator virtually calculating an occupancy of a decoding video buffer temporarily storing the video streams, a virtual decoding audio buffer occupancy calculator virtually calculating an occupancy of a decoding audio buffer temporarily storing the audio streams, a virtual decoding audio buffer storing a calculation result in the virtual decoding audio buffer occupancy calculator, and a payload length setting section setting an overflow limit value for the virtual decoding audio buffer. The payload length setting section sets the overflow limit value to a value of an integral multiple of an audio frame length.

According to another aspect of the present invention, there is provided a data multiplexing method for arranging video streams and audio streams respectively into packs and multiplexing these packs to create a system stream. The method includes determining if the system stream is immediately before a random access point, virtually calculating an occupancy of a decoding audio buffer temporarily storing the audio streams, comparing the calculated virtual occupancy of the decoding audio buffer with an overflow limit value that is an integral multiple of an audio frame length; and setting a payload length of an audio pack to be created based on a comparison result.

The present invention sets an overflow limit value to an integral multiple of an audio frame length, thereby allowing a frame to complete in an audio pack immediately before a random access point. It is thus possible to reduce the number of invalid packs or the like in a system stream and increase the bit rate efficiency.

BRIEF DESCRIPTION OF THE DRAWINGS

The above and other objects, advantages and features of the present invention will be more apparent from the following description taken in conjunction with the accompanying drawings, in which:

FIG. 3A is a view showing an audio frame of the first embodiment;

FIG. 3B is a view showing an audio pack of the first embodiment;

FIG. 3C is a view showing a system stream of the first embodiment;

FIG. 3D is a view showing the occupancy of a virtual decoding audio buffer of the first embodiment;

FIG. 4 is a flowchart showing the flow of a multiplexing operation of the first embodiment;

FIG. 5A is a view showing an audio frame of a second embodiment of the invention;

FIG. 5B is a view showing an audio pack of the second embodiment;

FIG. 5C is a view showing a system stream of the second embodiment;

FIG. 5D is a view showing the occupancy of a virtual decoding audio buffer of the second embodiment;

FIG. 7A is a view showing an audio frame of a third embodiment of the invention;

FIG. 7B is a view showing an audio pack of the third embodiment;

FIG. 7C is a view showing a system stream of the third embodiment;

FIG. 7D is a view showing the occupancy of a virtual decoding audio buffer of the third embodiment;

FIG. 10A is a view showing a conventional audio frame;

FIG. 10B is a view showing a conventional audio pack;

FIG. 10C is a view showing a conventional system stream; and

FIG. 10D is a view showing the occupancy of a conventional virtual decoding audio buffer.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

Figure 1:
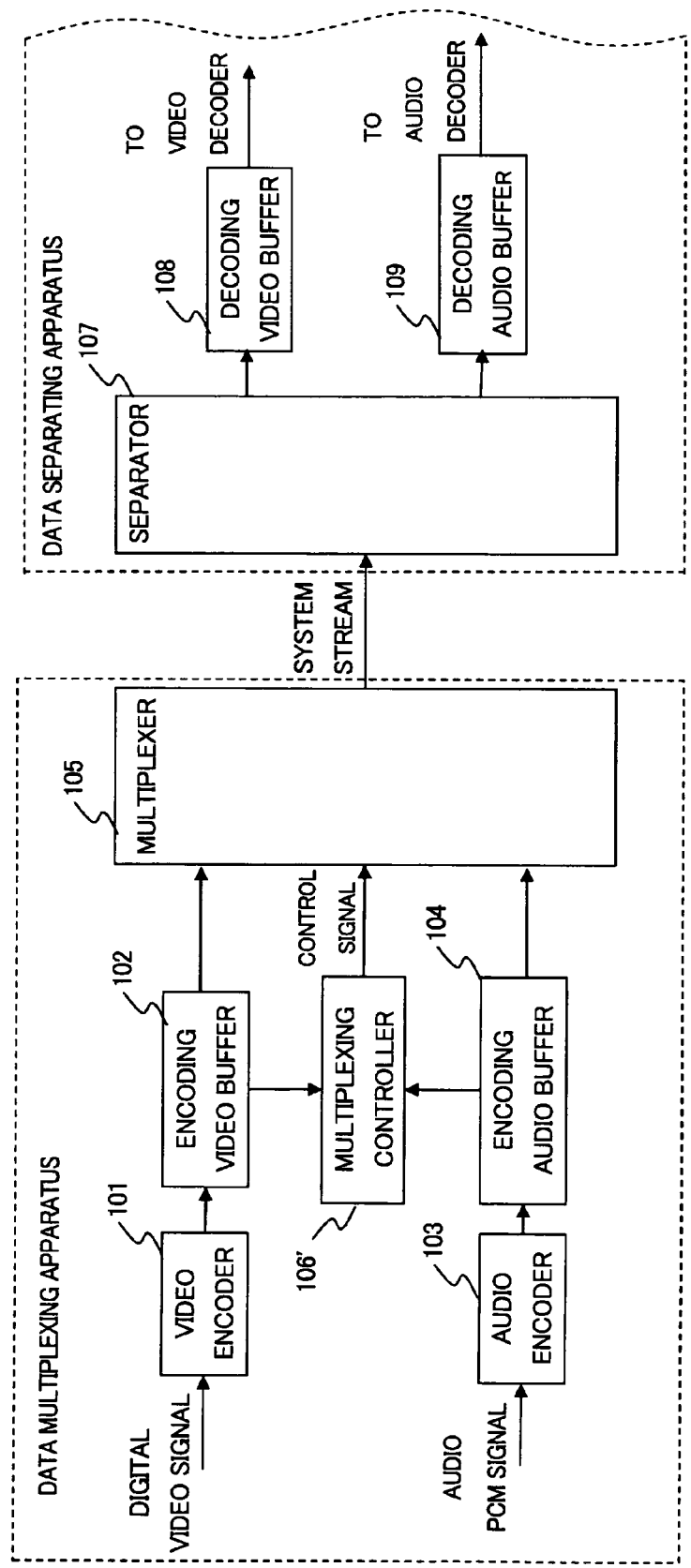
FIG. 1 is a pattern diagram showing the configuration of a multiplexing controller of a first embodiment of the invention.
Figure 2:
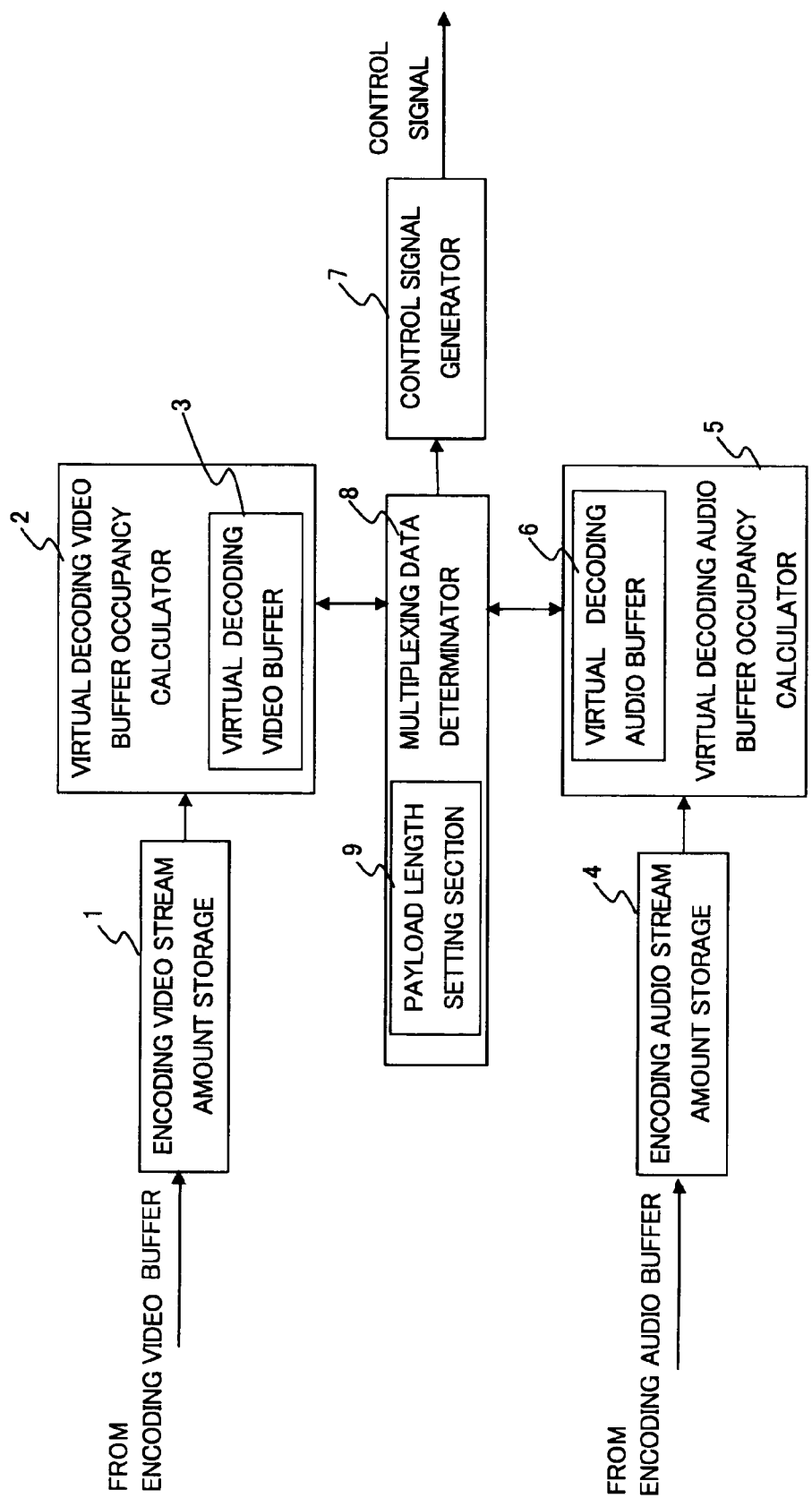
FIG. 2 is a pattern diagram showing the configuration of a multiplexing controller of an embodiment of the invention.
Figure 8:
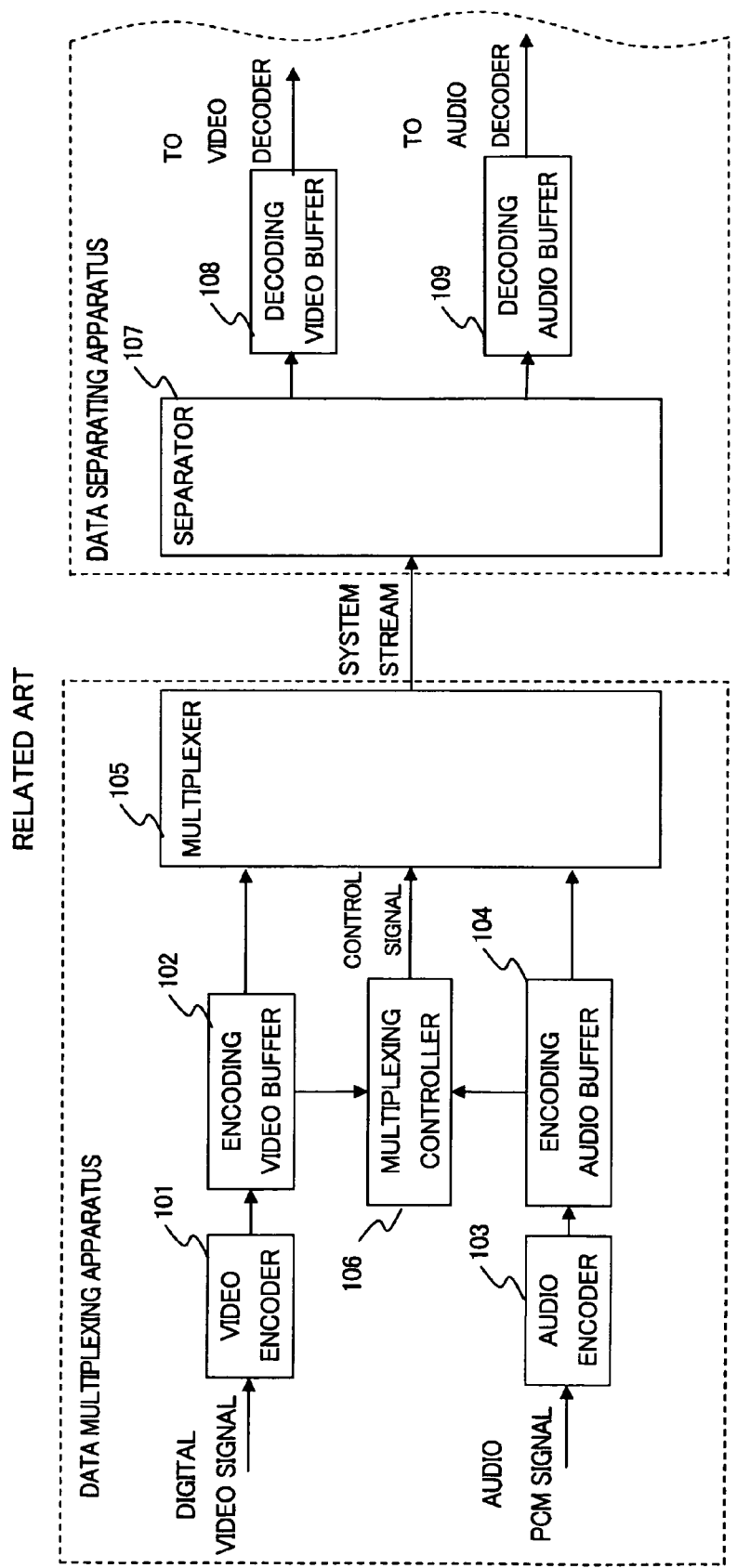
FIG. 8 is a view showing the configuration of a data multiplexing apparatus.
Figure 9:
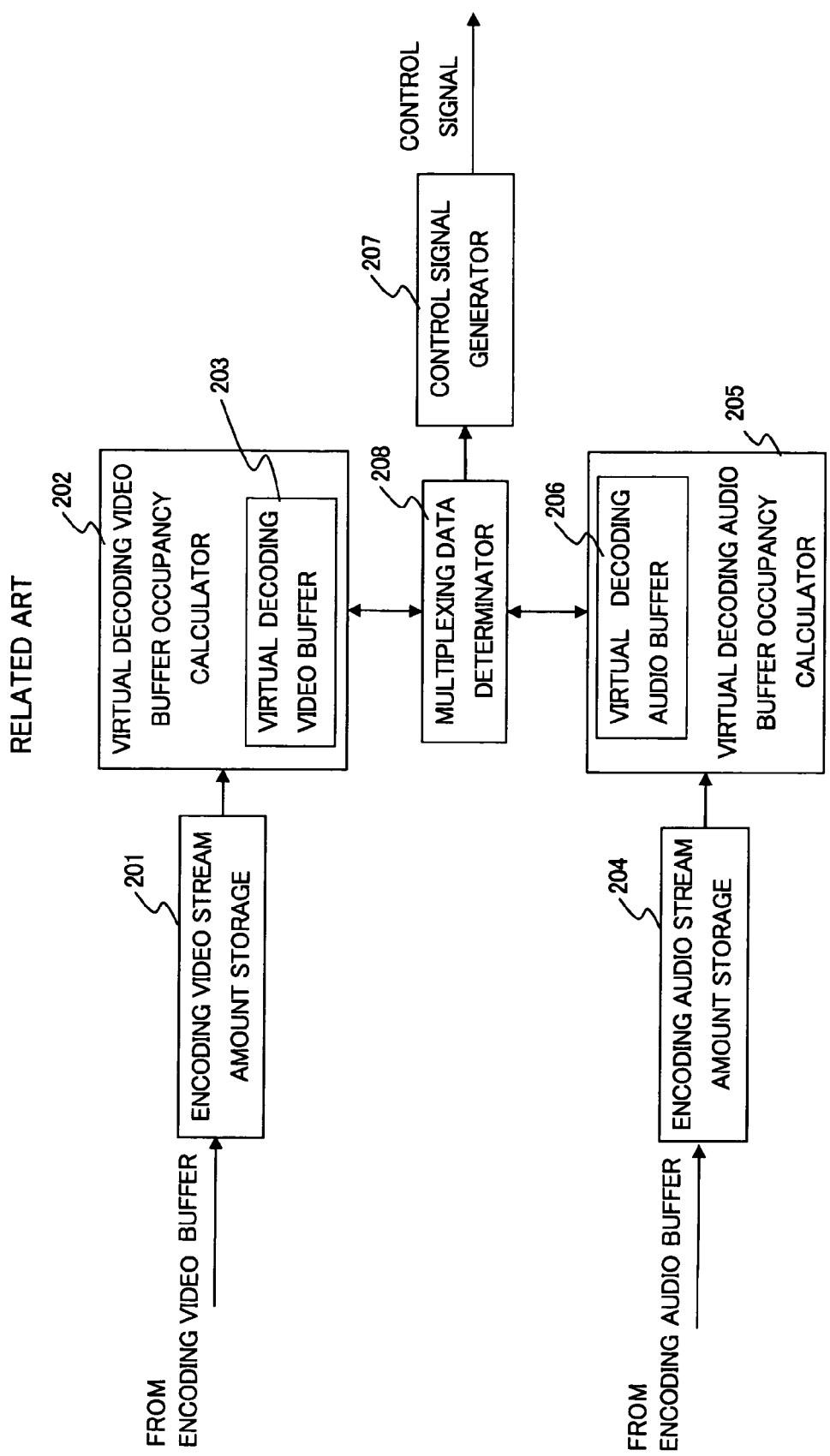
FIG. 9 is a schematic view showing the configuration of a conventional multiplexing controller.

A first embodiment of the present invention is described hereinafter with reference to the drawings. FIG. 1 is a view showing the entire configuration of a data multiplexing apparatus according to a first embodiment of the invention. In the data multiplexing apparatus shown in FIG. 1, the same elements as in FIG. 8 are denoted by the same reference numerals and not detailed herein. The data multiplexing apparatus of this embodiment is different from the data multiplexing apparatus shown in FIG. 8 in that the multiplexing controller 106 is replaced with a multiplexing controller 106'. The multiplexing controller 106' shown in FIG. 1 also controls the amount of video and audio streams and determines the timing of multiplexing and so on. FIG. 2 shows the detailed configuration of the multiplexing controller 106'.

The multiplexing controller 106' includes an encoding video stream amount storage 1, a virtual decoding video buffer occupancy calculator 2, a virtual decoding video buffer 3, an encoding audio stream amount storage 4, a virtual decoding audio buffer occupancy calculator 5, a virtual decoding audio buffer 6, a control signal generator 7 and a multiplexing data determinater 8.

The encoding video stream amount storage 1 stores the amount of video streams that are stored in the encoding video buffer 102. The virtual decoding video buffer occupancy calculator 2 virtually calculates the amount of video streams that are accumulated in the decoding video buffer 108 and stores the result into the virtual decoding video buffer 3. The virtual decoding video buffer 3 is a register or the like for storing the calculation results and it stores a virtual value of the occupancy amount of the decoding video buffer 108 in the decoder.

The encoding audio stream amount storage 4 stores the amount of audio streams that are stored in the encoding audio buffer 104. The virtual decoding audio buffer occupancy calculator 5 virtually calculates the amount of audio streams that are accumulated in the decoding audio buffer 109 and stores the result into the virtual decoding audio buffer 6. The virtual decoding audio buffer 6 is a register or the like for storing the calculation results and it stores a virtual value of the occupancy amount of the decoding audio buffer 109 in the decoder.

The multiplexing data determinater 8 determines the type of pack to be multiplexed, the length of a stream, and the timing of multiplexing based on the amount of video streams stored in the encoding video buffer 102, the amount of audio streams stored in the encoding audio buffer 104, the virtual occupancy amount of the decoding video buffer stored in the virtual decoding video buffer 3, and the virtual occupancy amount of the decoding audio buffer stored in the virtual decoding audio buffer 6. The control signal generator 7 generates a signal for informing the multiplexer 105 of what is determined by the multiplexing data determinater 8.

In the first embodiment, the multiplexing data determinater 8 includes a payload length setting section 9. The payload length is described firstly. In the following description, the payload length is an audio stream length that is included in one audio pack. If an audio pack includes a padding packet that is invalid data, the padding packet is not included in the payload length. Even if no padding packet is included, a maximum payload length is restricted by an audio pack length. Thus, the maximum payload length equals a maximum stream length LP after subtracting a header length from a pack length.

In the first embodiment, the payload length setting section 9 sets a payload length included in an audio pack. The payload length set by the payload length setting section 9 and the creation of an audio pack are described below.

In this embodiment, the payload length setting section 9 sets a virtual second capacity BfMax' for the virtual decoding audio buffer 6 as an overflow limit value of a virtual decoding audio buffer. The virtual second capacity BfMax', which is referred to herein as the overflow limit value, is an integral multiple of an audio frame length LF and it is smaller than the capacity BfMax of an virtual decoding audio buffer that is regulated by the standards. In this embodiment, the payload length setting section 9 sets a payload length based on a difference between the overflow limit value BfMax' and the occupancy of the virtual decoding audio buffer. This embodiment performs multiplexing of an audio pack when the difference between the overflow limit value BfMax' and the buffer occupancy is larger than the payload length set by the payload length setting section 9.

FIGS. 3A to 3D are views showing the transition of the occupancy of a virtual decoding audio buffer, audio packs, and audio frames according to this embodiment. FIG. 3D corresponds to the calculation result of the virtual decoding audio buffer occupancy calculator 5 and shows the values stored in the virtual decoding audio buffer 6. The specific operation of the data multiplexing apparatus of this embodiment is described hereinafter with reference to FIG. 3.

Though the following description uses easy values such as 10 bytes and 30 bytes for simplification, actual frame length, pack length and so on are not restricted to these values but vary according to standards.

An audio stream described herein is composed of five audio frames A11 to A15, each having the frame length LF of 10 bytes. The audio pack length is 20 bytes and the header length is 2 bytes, for example. In this case, the maximum payload length LP is 18 bytes. The payload length setting section 9 sets the overflow limit value BfMax' to 30 bytes.

In this embodiment, the multiplexing data determinater 8 creates an audio pack AP so as not to exceed the overflow limit value BfMax'.

First, in normal audio pack multiplexing operation, the payload length setting section 9 sets the payload length constantly at a maximum stream length LP. At t1 in FIG. 3D, since the free space of the virtual decoding audio buffer with respect to the virtual second capacity BfMax' is 30 bytes, it is determined that the audio stream corresponding to the maximum stream length LP is arranged into the audio pack. In this case, the whole length of the audio frame A11 and the first 8 bytes of the audio frame A12 are multiplexed into the audio pack AP11 at a predetermined bit rate from t1 to t2. Therefore, the virtual decoding audio buffer is occupied with 18 bytes as shown in t2 in FIG. 3D.

In the period from t2 to t3, a difference between the overflow limit value BfMax' and the occupancy of the virtual decoding audio buffer is 12 bytes. Since there is no space corresponding to the maximum payload length LP (18 bytes in this case), multiplexing of the audio pack is not performed.

After that, at t3, the stream amount accumulated in the audio buffer decreases by the amount corresponding to the frame length LF. Since LF is 10 bytes for simplification of description, the virtual decoding audio buffer is occupied with 18−10=8 bytes. According to the standards, the decrease occurs at once, not at the gradient based on the bit rate. Since the virtual decoding audio buffer has the free space of 22 bytes with respect to the overflow limit value BfMax', the audio stream corresponding to the maximum stream length LP (18 bytes) is arranged into the audio pack from t4 to t5. In this case, the audio pack AP12 includes the remaining 2 bytes of the audio frame A12, the whole 10 bytes of the audio frame A13, and the first 6 bytes of the audio frame A14 as shown in FIG. 3B. In this case, the virtual decoding audio buffer is occupied with 18+8=26 bytes as shown in t5 of FIG. 3D.

In this way, during the normal operation, the process repeats the multiplexing of an audio pack when there is a space for the maximum stream length LP with respect to the overflow limit value BfMax' just like conventional techniques.

The operation immediately before a random access point (RAP) is described below. Immediately before RAP, the payload length setting section 9 calculates a difference between the overflow limit value BfMax' and the occupancy of the virtual decoding audio buffer. Since the overflow limit value is set to an integral multiple of an audio frame, there is a difference corresponding to at least the rest of the stream LFR of the output audio frame between the overflow limit value BfMax' and the occupancy of the virtual decoding audio buffer.

If addition of the rest of stream LFR of the audio frame that is output already, which is the remaining 4 bytes of the audio frame A14, to the virtual decoding audio buffer does not result in exceeding the overflow limit value BfMax', the payload length is set to LFR+n*LF (n is an integer of 0 or above). In this case, 4+1*10=14 bytes are set as a payload length LP'. After setting the payload length in this way, the multiplexing of an audio pack is performed.

As described above, in the first embodiment, the payload length setting section 9 sets a payload length immediately before RAP based on a difference between the overflow limit value BfMax' and the occupancy of the virtual decoding audio buffer. If the difference is equal to or greater than the rest of the stream of the audio frame that is multiplexed already, the payload length that can be multiplexed into an audio pack is set to LFR+n*LF. As a result, since the overflow limit value BfMax' is an integral multiple of an audio frame length, the payload length defined immediately before RAP is a sum of the rest of the stream (LFR) of the multiplexed frame and an integral multiple of the frame length. For example, the payload length setting section 9 sets 14 bytes immediately before RAP in the above case.

In this way, this embodiment sets the overflow limit value BfMax' and further sets a payload length LP' based on a difference between the overflow limit value BfMax' and the occupancy of the buffer immediately before RAP. It then multiplexes an audio pack, thereby assuring to include complete audio frame data in the audio pack immediately before RAP.

According to this embodiment, since the payload length setting section 9 sets the overflow limit value BfMax' (second virtual decoding audio buffer capacity) to an integral multiple of the flame length of an audio frame, it is possible to reduce the output of invalid packs, which has been required in conventional techniques until an audio pack corresponding to the rest of the stream of the audio frame is created.

In a conventional multiplexing apparatus, if an audio frame is incomplete and a remaining stream is left, it is sometimes necessary to output invalid pack that is entirely composed of invalid data until the remaining stream is arranged into a system stream even after creation of a final video pack of the group of the image ends immediately before RAP as shown from t8 to t10 in FIG. 10. On the other hand, this embodiment allows the audio pack that is created immediately before RAP to be always an audio pack where an audio frame is completed. It is thereby possible to eliminate creation of an invalid pack or the like due to the presence of a remaining stream in an audio frame or the like. This reduces invalid data included in a system stream, thus increasing the efficiency of a bit rate.

FIG. 4 shows the flowchart that describes the above operation. In FIG. 4, the process first determines if it is immediately before RAP or not in Step S301 since a set payload length (LP and LP') depends thereon. If it is not immediately before RAP, the process adds the maximum payload length LP to the occupancy of the buffer and determines if the result exceeds the overflow limit value BfMax' or not in S305. If it does not exceed the overflow limit value BfMax', the process multiplexes the audio pack at the maximum payload length LP in S306. If, on the other hand, it exceeds the overflow limit value BfMax', the process multiplexes the video pack or the like or waits in S307.

In Step S301, if the process determines that it is immediately before RAP, it compares a difference of the buffer occupancy and the overflow limit value BfMax' with the remaining stream LFR of the frame. According to the comparison result, the process performs the setting of the payload length LP' immediately before RAP in S303 or the multiplexing of another pack or waiting in S304.

The first embodiment repeats this operation in the multiplexing of the audio pack AP.

Second Embodiment

FIG. 5 is a view showing the occupancy of a virtual decoding audio buffer according to a second embodiment of the invention. A data multiplexing apparatus of the second embodiment is described hereinafter with reference to FIG. 5.

In the data multiplexing apparatus and method described in the first embodiment, there is the possibility that the occupancy of the virtual decoding audio buffer may satisfy the following conditions:

Buffer occupancy+Maximum payload length (LP) of one pack>Overflow limit value $BfMax'$     (1)

Buffer occupancy−Audio frame length (LF)<0     (2)

Specifically, the payload length is set to a maximum payload length LP in normal multiplexing operation, which is not immediately before RAP, in the first embodiment. In this case, if the condition (1) is satisfied, the multiplexing of an audio pack cannot be performed. Further, if the condition (2) is satisfied, underflow occurs in the virtual decoding audio buffer when the fixed frame length LF is subtracted next time.

Therefore, there is the possibility that processing breakdown occurs in the multiplexing data determinater 8 when the occupancy of the virtual decoding audio buffer satisfies the conditions (1) and (2) at some point. Description of this case with easy values is as follows. If the frame length is 10 bytes, the maximum payload length LP is 18 bytes, and the overflow limit value BfMax' is 20 bytes, after the maximum payload length LP of 18 bytes is written, 10 bytes corresponding to the frame length LF is subtracted, so that the buffer occupancy becomes 8 bytes. In this case, it is impossible to perform neither the multiplexing of the audio pack corresponding to the maximum payload length LP nor the subtraction of the frame length LF.

The possibility of satisfying the conditions (1) and (2) occurs when the following condition (3) is satisfied.

Audio frame length (LF)+Maximum payload length (LP)>Overflow limit value ($BfMax'$)     (3)

FIG. 5 is a view showing the audio frame of the virtual decoding audio buffer memory, the audio pack, the occupancy of the virtual decoding audio buffer and so on that have the above possibility. The payload length setting operation of the second embodiment is described hereinafter with reference to FIG. 5. At t1 in FIG. 5D, since there is a space that is not less than the maximum payload length LP with respect to the overflow limit value, the multiplexing of the audio pack AP21 corresponding to the maximum payload length LP is determined. The value stored in the virtual decoding audio buffer increases from t1 to t2 at a predetermined gradient. As a result, the occupancy of the virtual decoding audio buffer increases as shown in t2 of FIG. 5D. After that, the subtraction of the amount corresponding to the audio frame length LF is performed as shown in t3 of FIG. 5D. In this case, it is assumed that the conditions (1) and (2) are satisfied at t3 in FIG. 5D. In the second embodiment, when the conditions (1) and (2) are satisfied, the payload length setting section 9 calculates a difference between the overflow limit value BfMax' and the occupancy of the virtual decoding audio buffer and sets this difference as the payload length LP'. Then, it performs the multiplexing of the audio pack when the difference between the occupancy of the virtual decoding audio buffer and the overflow limit value becomes equal to or more than the payload length LP' as shown in t4 of FIG. 5D.

Since BfMax' is an integral multiple of the audio frame length LF, the audio pack AP22 in this case includes the remaining stream of the audio frame A22 that is not included in the audio pack AP21 and the whole stream of the audio frame A23.

The audio stream of the payload length LP' is then added with a padding packet, thereby forming the audio pack AP22. This audio pack is multiplexed into the system stream.

After that, the data multiplexing apparatus of this embodiment repeats the creation of the audio pack by setting the payload length to LP' that is a difference between the overflow limit value BfMax' and the occupancy of the virtual decoding audio buffer when the above conditions (1) and (2) are satisfied while setting it to the maximum payload length LP in normal times.

This embodiment is the same as the first embodiment in that the payload length is determined based on the difference between the overflow limit value BfMax' and the occupancy of the virtual decoding audio buffer immediately before RAP, and thus this is not described herein.

The second embodiment thus sets the maximum payload length LP as a basic payload length during normal multiplexing operation. However, even in the normal multiplexing operation, if the conditions (1) and (2) are satisfied, it sets a difference between the overflow limit value BfMax' and the occupancy of the virtual decoding audio buffer as a payload length LP'.

In this embodiment, the payload length setting section 9 changes the settings of the payload length also when the conditions (1) and (2) are satisfied, thereby allowing multiplexing of an audio stream with the efficient use of a bit rate without the occurrence of processing breakdown.

Figure 6:
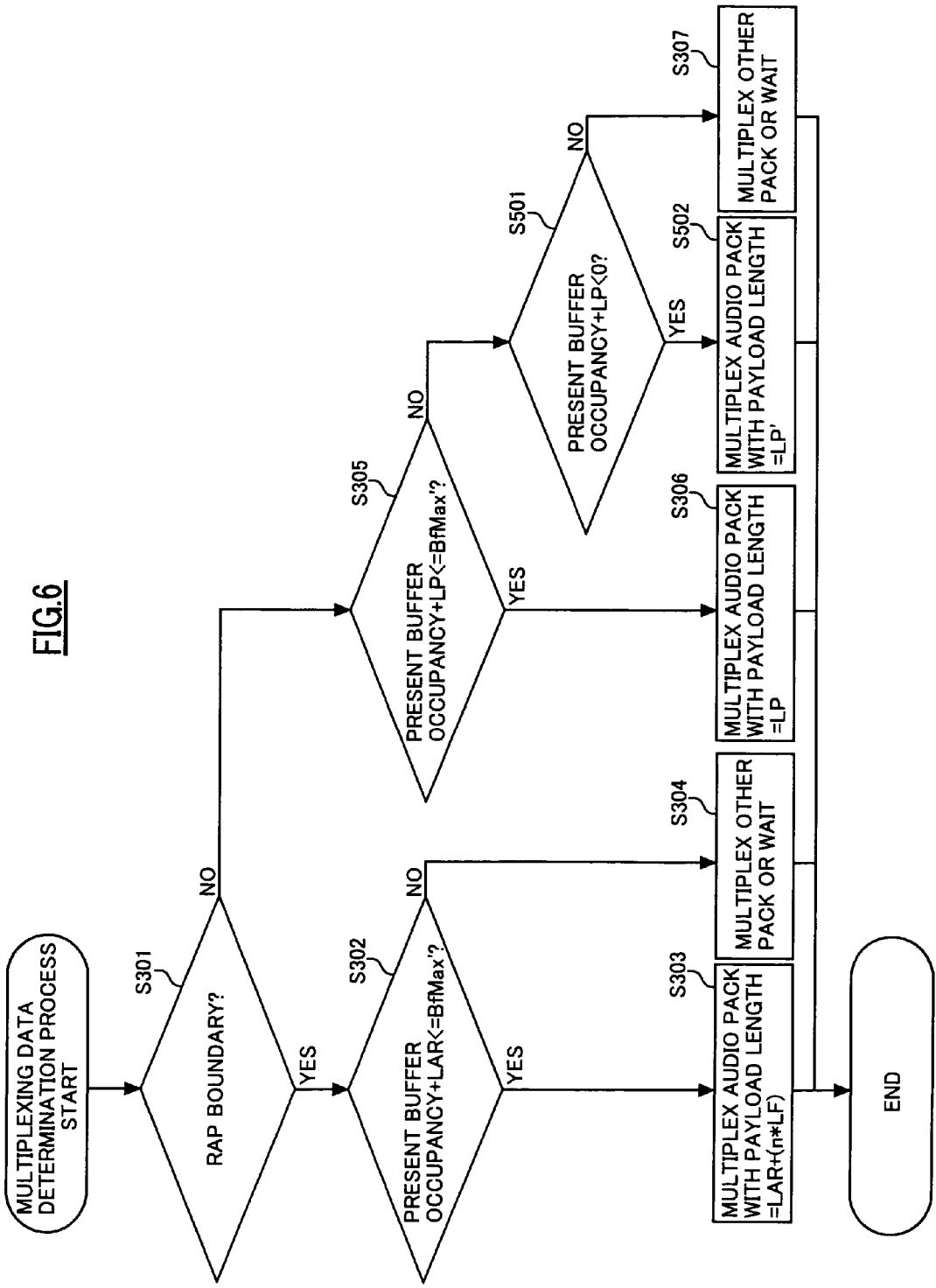
FIG. 6 is a flowchart showing the flow of a multiplexing operation of the second embodiment.

FIG. 6 shows the flowchart showing the series of operation described above. FIG. 6 is different from FIG. 4 in that it includes Step S501 that determines if the condition (2) is satisfied and Step S502 that multiplexing an audio pack of the payload length LP'.

If the data multiplexing method of the second embodiment is applied to DVD standards, the condition (3) is satisfied in the case when multiplexing an audio stream by DOLBY AC-3, which is a registered trademark.

In the case of the audio stream by DOLBY AC-3 (registered trademark) at the sampling frequency of 48 kHz and bit rate of 384 kbps, a padding packet of 579 bytes is inserted once in 5 frames. In the case of the audio stream by DOLBY AC-3 (registered trademark) at the sampling frequency of 48 kHz and bit rate of 448 kbps, a padding packet of 227 bytes is inserted once in 10 frames.

The data multiplexing method of the second embodiment allows promoting a bit rate just like the first embodiment. It further allows preventing the occurrence of underflow or the like due to the settings of the audio frame length and the overflow limit value. Table 1 below shows the comparison of the bit rate in the data multiplexing of this embodiment with the bit rate in conventional data multiplexing. The efficiency of the bit rate is higher in this embodiment as shown in Table 1.

TABLE 1

| | Audio bit rate (sampling frequency: 48 kHz) | Wasted consumption of system bit rate | Substantial system bit rate |
|---|---|---|---|
| Conventional Technique | All bit rates | 645 kbps | 9.44 Mbps |
| Second Embodiment | 384 kbps | 29 kbps | 10.05 Mbps |
| | 448 kbps | 6.6 kbps | 10.07 Mbps |
| | Other | None | 10.08 Mbps |

Third Embodiment

The first and second embodiments describe the case that sets the overflow limit value BfMax' to an integral multiple of the audio frame length and controls the multiplexing of the audio pack so as not to exceed the overflow limit value.

The third embodiment describes the case of setting the overflow limit value BfMax' when the audio frame length varies slightly with use of DOLBY AC-3 (registered trademark) at the sampling frequency of 44.1 kHz, for example.

With the DOLBY AC-3 (registered trademark) at the sampling frequency of 44.1 kHz and the bit rate of 256 kbps, the normal frame length is 1114 bytes. However, the audio frame with the frame length of 1115 bytes exists at the rate of one in several frames. Thus, in this embodiment, the payload length setting section 9 sets the overflow limit value and the payload length as follows.

If a minimum audio frame length is LB, the overflow limit value BfMax' is set to an integral multiple of LB.

When the overflow limit value BfMax' is set like this, this embodiment multiplies the audio pack at the maximum payload length LP so as not to exceed the overflow limit value during normal operation. If a sum of the buffer occupancy and LP exceeds the overflow limit value BfMax', it sets the payload length LP' based on a difference between the overflow limit value BfMax' and the buffer occupancy just like the second embodiment. Further, it sets the payload length immediately before RAP basically in the same way as the first and second embodiments.

In the third embodiment, however, the frame length is not fixed to LB but varies in the range from LB to LB+m.

Therefore, even when the payload length is set based on a difference between the overflow limit value BfMax' and the buffer occupancy immediately before RAP according to the number of frames with the frame length of LB+m, the whole stream of the final frame does not complete in one audio pack in some cases.

Since the overflow limit value BfMax' is actually a calculated capacity that is set for making one frame data complete immediately before RAP, a margin corresponding to the value of BfMax−BfMax' exists practically in the virtual decoding audio buffer.

Thus, if the number of frames N that is storable within the overflow limit value BfMax' is N=BfMax'/LB if all frames have the minimum frame length. Even if all frames have the frame length of LB+m, the increase is only m*(BfMax'/LB) bytes compared with the case when all frames have the minimum frame length. Thus, if the capacity of the virtual decoding audio buffer that is defined by the standards is larger than the overflow limit value BfMax' by the amount corresponding this difference, it is possible to multiplex an audio pack that includes the whole stream of the final frame immediately before RAP even when the audio frame length varies. Specifically, setting the overflow limit value BfMax' so as to satisfy the following condition (4) assures to complete the stream in one frame immediately before RAP.

$$BfMax - BfMax' > m*(BfMax'/LB) \text{ where } m \text{ is a natural number.} \quad (4)$$

Thus, by setting the overflow limit value BfMax' to an integral multiple of the minimum frame length and so as to satisfy the above condition (4), it is possible to allow the multiplexing of an audio pack even if the buffer occupancy exceeds the overflow limit value BfMax' immediately before RAP and thereby multiplex an audio pack without causing overflow of the actual virtual decoding audio buffer.

FIGS. 7A to 7D are views showing the occupancy of the virtual decoding audio buffer, the audio frame and so on according to the third embodiment. At t9 in FIG. 7D, though the occupancy of the virtual decoding audio buffer immediately before RAP exceeds the overflow limit value BfMax', it does not exceed the capacity BfMax of the virtual decoding audio buffer and therefore allow the creation of an audio pack normally.

As described in the foregoing, the present invention sets the overflow limit value that is lower than the capacity of the virtual decoding audio buffer regulated by the standards and implements the control so as not to exceed the limit value, thereby reducing the possibility that the frame does not complete immediately before RAP and invalid pack or the like is created. This increases the efficiency of the bit rate and improves the image quality.

Though the above embodiments are described with an example of the audio stream in MPEG standards or the like, the present invention is not limited thereto and may be applied to encoding and decoding when a unit of data is a fixed length.

It is apparent that the present invention is not limited to the above embodiment that may be modified and changed without departing from the scope and spirit of the invention.

What is claimed is:

1. A data multiplexing apparatus for arranging video streams and audio streams respectively into fixed-length packs and multiplexing these packs to create a system stream, the apparatus comprising:
    a virtual decoding audio buffer occupancy calculator virtually calculating an occupancy of a decoding audio buffer for temporarily storing payloads in audio packs obtained by arranging the audio streams; and
    a payload length setting section defining a value of an integral multiple of an audio frame length as an overflow limit capacity for the decoding audio buffer, and determining, at a time just before a random access point, a payload length of an audio pack to be created based on a difference between the overflow limit capacity and the occupancy, the audio frame length being different from a maximum payload length that is capable of being included in the audio pack.

2. The data multiplexing apparatus according to claim 1, wherein the overflow limit capacity is less than a capacity of the decoding audio buffer.

3. The data multiplexing apparatus according to claim 1, wherein the payload length of the audio pack is reduced if the overflow limit capacity is less than a sum of a default payload length and the occupancy.

4. The data multiplexing apparatus according to claim 3, wherein if the overflow limit capacity is greater than a sum of the default payload length and the occupancy, then the default payload length is not utilized and a remainder of a data length of the audio frame length would be used as the payload length.

5. The data multiplexing apparatus according to claim 1, wherein the payload length setting section determines, during the system stream at the time just before the random access point, the payload length of the audio pack to be created.

6. A data multiplexing method for arranging video streams and audio streams respectively into fixed-length packs and multiplexing these packs to create a system stream, the method comprising:
virtually calculating an occupancy of a decoding audio buffer for temporarily storing payloads in audio packs obtained by arranging the audio streams;
comparing the occupancy with an overflow limit capacity for the decoding audio buffer, the overflow limit capacity being set to a value of an integral multiple of an audio frame length, the audio frame length being different from a maximum payload length that is capable of being included in an audio pack; and
determining, at a time just before a random access point, a payload length of the audio pack to be created based on a comparison result.

7. The data multiplexing method according to claim 6, wherein the overflow limit capacity is less than a capacity of the decoding audio buffer.

8. The data multiplexing method according to claim 7, wherein the payload length is set to a value of a difference between the overflow limit capacity and the occupancy when a result after adding the maximum payload length to the occupancy exceeds the overflow limit capacity.

9. The data multiplexing method according to claim 7, wherein a difference between the overflow limit capacity and the capacity of the decoding audio buffer is equal to or larger than a value of multiplying the number of frames storable in the decoding audio buffer by a difference between a maximum frame length and a minimum frame length that can be had by the audio frame.

10. The data multiplexing method according to claim 6, wherein the payload length is set to a value of a difference between the overflow limit capacity and the occupancy when a result after adding the maximum payload length to the occupancy exceeds the overflow limit capacity.

11. The data multiplexing method according to claim 10, wherein a difference between the overflow limit capacity and a capacity of the decoding audio buffer is equal to or larger than a value of multiplying the number of frames storable in the decoding audio buffer by a difference between a maximum frame length and a minimum frame length that can be had by the audio frame.

12. The data multiplexing method according to claim 6, wherein a difference between the overflow limit capacity and a capacity of the decoding audio buffer is equal to or larger than a value of multiplying the number of frames storable in the decoding audio buffer by a difference between a maximum frame length and a minimum frame length that can be had by the audio frame.

13. The data multiplexing method according to claim 6, wherein the payload length of the audio pack is reduced if the overflow limit capacity is less than a sum of a default payload length and the occupancy.

14. The data multiplexing apparatus according to claim 13, wherein if the overflow limit capacity is greater than a sum of the default payload length and the occupancy, then the default payload length is not utilized and a remainder of a data length of the audio frame length would be used as the payload length.

15. A data multiplexing apparatus for arranging stream data into fixed-length packs and multiplexing these packs, the apparatus comprising:
a virtual decoding buffer occupancy calculator virtually calculating an occupancy of a decoding buffer temporarily storing payloads in the packs; and
a payload length setting section defining a value of an integral multiple of a frame length of the stream data as an overflow limit capacity for the decoding buffer, and determining, at a time just before a random access point, a payload length of a pack to be created based on a difference between the overflow limit capacity and the occupancy, the frame length being different from a maximum payload length that is capable of being included in the pack.

16. The data multiplexing apparatus according to claim 15, wherein the payload length of the pack is reduced if the overflow limit capacity is less than a sum of a default payload length and the occupancy.

17. The data multiplexing apparatus according to claim 16, wherein if the overflow limit capacity is greater than a sum of the default payload length and the occupancy, then the default payload length is not utilized and a remainder of a data length of the audio frame length would be used as the payload length.

* * * * *